(12) United States Patent
Steeven

(10) Patent No.: US 12,539,124 B2
(45) Date of Patent: Feb. 3, 2026

(54) PATELLA PREPARATION SYSTEM

(71) Applicant: Aesculap AG, Tuttlingen (DE)

(72) Inventor: Blanc Steeven, Chaumont (FR)

(73) Assignee: Aesculap AG, Tuttlingen (DE)

( * ) Notice: Subject to any disclaimer, the term of this patent is extended or adjusted under 35 U.S.C. 154(b) by 320 days.

(21) Appl. No.: 18/030,189

(22) PCT Filed: Oct. 1, 2021

(86) PCT No.: PCT/EP2021/077107
§ 371 (c)(1),
(2) Date: Apr. 4, 2023

(87) PCT Pub. No.: WO2022/073871
PCT Pub. Date: Apr. 14, 2022

(65) Prior Publication Data
US 2023/0404598 A1 Dec. 21, 2023

(30) Foreign Application Priority Data

Oct. 6, 2020 (EP) .................................... 20200209

(51) Int. Cl.
*A61B 17/15* (2006.01)
*A61B 17/16* (2006.01)
*A61B 17/17* (2006.01)

(52) U.S. Cl.
CPC ........ *A61B 17/158* (2013.01); *A61B 17/1767* (2013.01); *A61B 17/1677* (2013.01)

(58) Field of Classification Search
CPC .............. A61B 17/158; A61B 17/1677; A61B 17/1767; A61F 2/461
See application file for complete search history.

(56) References Cited

U.S. PATENT DOCUMENTS

| 5,021,055 A | * | 6/1991 | Burkinshaw | A61B 17/158 606/88 |
| 5,147,365 A | * | 9/1992 | Whitlock | A61B 17/158 606/88 |
| 5,716,360 A | * | 2/1998 | Baldwin | A61B 17/1767 606/88 |
| 5,716,362 A | * | 2/1998 | Treacy | A61B 17/1677 606/88 |

(Continued)

FOREIGN PATENT DOCUMENTS

JP 2006136458 A 6/2006

OTHER PUBLICATIONS

Search Report received in European Application No. 20200209.3-1122 dated Jul. 9, 2021, 12 pages.

(Continued)

*Primary Examiner* — Matthew J Lawson
(74) *Attorney, Agent, or Firm* — Christopher A. Rothe; CM Law

(57) ABSTRACT

A patella preparation system and method of using a patella preparation system. The patella preparation system includes a fixing device adapted to fixedly hold a patella, a guiding device linked to the fixing device to be moveable relative to the fixing device, preferably by translatory and/or tilting movements/motions, and an operation device for manually moving the guiding device relative to the fixing device individually and separately in a translatory and a tilting manner.

20 Claims, 4 Drawing Sheets

(56) References Cited

U.S. PATENT DOCUMENTS

| | | | |
|---|---|---|---|
| 6,010,509 A * | 1/2000 | Delgado | A61F 2/461 606/88 |
| 8,747,410 B2 * | 6/2014 | Claypool | A61B 17/158 606/88 |
| 10,314,599 B2 * | 6/2019 | Hampp | A61B 17/1767 |
| 11,642,138 B2 * | 5/2023 | Petteys | A61B 17/158 606/88 |
| 11,723,677 B2 * | 8/2023 | Collazo | A61B 17/1767 606/88 |
| 2003/0163137 A1 * | 8/2003 | Smucker | A61B 17/1767 606/87 |
| 2006/0142777 A1 * | 6/2006 | Bastian | A61B 17/158 606/88 |
| 2008/0097450 A1 * | 4/2008 | Brown | A61B 17/158 606/88 |
| 2012/0101504 A1 | 4/2012 | Habegger et al. | |
| 2012/0209393 A1 * | 8/2012 | Ries | A61F 2/3877 623/20.2 |
| 2013/0030539 A1 * | 1/2013 | Wright | A61B 17/158 606/88 |
| 2013/0211410 A1 | 8/2013 | Landes et al. | |
| 2013/0338672 A1 | 12/2013 | Harris et al. | |
| 2015/0005772 A1 * | 1/2015 | Anglin | A61B 17/1767 434/262 |
| 2024/0032947 A1 * | 2/2024 | Canepa | A61B 17/1677 |
| 2025/0009367 A1 * | 1/2025 | Petteys | A61B 17/1767 |
| 2025/0114216 A1 * | 4/2025 | Snauwaert | A61F 2/461 |

OTHER PUBLICATIONS

Search Report received in International Application No. PCT/EP2021/077107 dated Jan. 4, 2022, 5 pages.

Written Opinion received in International Application No. PCT/EP2021/077107 dated Jan. 4, 2022, 9 pages.

Office Action received in Japanese Application No. 2023-521144 dated Mar. 17, 2025, with translation, 5 pages.

* cited by examiner

PATELLA PREPARATION SYSTEM

CROSS-REFERENCE TO RELATED APPLICATIONS

This application is the United States national stage entry of International Application No. PCT/EP2021/077107, filed Oct. 1, 2021, and claims priority to European Application No. 20200209.3, filed Oct. 6, 2020. The contents of International Application No. PCT/EP2021/077107 and European Application No. 20200209.3 are incorporated by reference herein in their entireties.

FIELD

The present disclosure relates to joint arthroplasty, especially knee arthroplasty and total knee arthroplasty. More specifically, the disclosure concerns a medical device, which enables the surgeon to efficiently and accurately cut/resect a patella against the background of patella resurfacing or patella implantation/patella replacement. In particular, the disclosure relates to a patella preparation system/device and a method of using the same.

BACKGROUND

The knee joint enables a person's leg to flex or articulate during movement. At the knee, a lower bone (tibia) meets an upper bone (femur). The patella or kneecap is a piece of bone supported in front of the knee joint. Functionally, the patella acts as a shield. The patella is fixed to the quadriceps which almost completely encircles the femur via a quadriceps tendon and with the tibia via a patella tendon.

The knee joint may be rendered nearly or totally inoperative by extended and heavy use, disease, or trauma. Often, the best therapy is total replacement (arthroplasty). During total knee arthroplasty, the femoral and tibial surfaces joined at the knee are totally replaced. Often, the patella is at least partially damaged as well and has either to be resurfaced or has to be completely replaced. Against this background, the patella has to be cut or resected, usually along a cross-sectional area of the patella in a special predetermined height.

It is well known, that at first the patella has to be fixed with a patella preparation instrument which has a guiding device/unit to guide a separate cutting/resection instrument. Then, the cutting/resection height and hence the height of the guiding device/unit in relation to the patella is adjusted by the patella preparation instrument. If the slope/the angle of the instrument with respect to the patella shall be changed, the fixation of the instrument with respect to the patella has to be released and the instrument has to be fixed again to the patella again.

For this purpose, usual patella preparation instruments/systems are embodied as/with a clamp with at least two clamping parts having a plurality of prongs which are configured to clamp the patella on its outer circumferential surface. The cutting height can be adjusted via a height gauge or an equivalent adjustment device. As already mentioned, the angle of the cutting device with respect to the patella can only be changed when the whole patella preparation instrument/device is newly positioned at the patella, which is complicate and inaccurate.

SUMMARY

Hence, there is a need to automatically adjust the cutting angle/slope to enable a user or surgeon who is using the patella preparation system to change the cutting angle without having to remove the patella preparation system from the patella during surgery. Furthermore, the fixation of the patella preparation system at the patella shall be improved such that the patella preparation system itself is not going to be incidentally slipped or shifted during surgery.

According to the gist of the present disclosure, the patella preparation system/instrument comprises:
- a fixing/holding unit/device being adapted to (fixedly) hold the patella,
- a cutting template or guiding unit/device linked to the fixing/holding unit/device to be moveable relative thereto (preferably) by translatory and/or tilting movements/motions and
- an (manual) actuation/operation unit/device/mechanism for manually moving the cutting template or guiding unit/device relative to the fixing/holding unit/device (preferably) individually and separately in translatory and tilting manner, respectively.

Such a system/device allows to (separately and individually) hold/grasp/clamp the patella by the fixing/holding unit/device as a first step. As a second step, the cutting template or guiding unit/device can be (linear) shifted/traversed and/or can be tilted relative to the fixing/holding unit/device (and, therefore, relative to the patella) individually and separately to the shifting/translation movement thereof such that a separate cutting tool being guided by the cutting template or guiding unit/device achieves a precise cutting position and orientation (angle) relative to the patella.

More concrete, the patella preparation system/instrument described herein may be applied for total knee replacement (TKR) as a surgical procedure wherein planar surfaces and/or curvilinear surfaces must be created in or on a bone to allow for proper attachment or implantation of prosthetic devices. In TKR a series of planar and/or curvilinear surfaces, or "resections," are created to allow for the attachment of prosthetic or other devices to the femur, tibia and/or patella.

The patella preparation system/instrument is used against the background of resurfacing or replacing a patella.

The patella preparation system/instrument according to the disclosure has the (disk-like) cutting template or guiding unit/device (afterwards simply called guiding device), especially for guiding a (separate) cutting instrument/cutting tool (being not part of the system/instrument), especially a working end/effector/saw blade of the cutting instrument, used to perform a resection on a patella. It further includes the fixing/holding unit/device (afterwards simply called fixing device) for fixing the patella preparation system/instrument to the patella (or vice versa).

Advantageously, the patella preparation system/instrument according to the disclosure allows adjustment of an angle of a separate cutting tool/instrument with respect to the patella without unlocking the fixation via the fixing device of the patella. A surgeon using this patella preparation system/instrument can, therefore, adjust a cutting position and angle in two separate steps within the system/instrument itself and does not have to remove and rearrange the system/instrument in relation to the patella to change a cutting angle. Via adjusting an angle of the patella cut/resection in a range between 0° and +/−7°, the tilt angle (an index of the medial/lateral tilt of the plane of the patella relative to the femur) of the patella can be adjusted.

The cutting tool/instrument may be a surgical saw and the working end of the surgical saw may be a saw blade.

The patella preparation system/instrument may therefore further have a (fork-like) clamping device/unit which can be used to ease positioning and/or fixation of the guiding device/unit with respect to the patella. The clamping device/unit can be transitioned between a clamping position and a released position. As the patella is connected to a quadriceps via a quadriceps tendon and with a tibia via a patella tendon, in the clamping position the clamping device encompasses the quadriceps and the patella tendon. In the released position, the clamping device is neither fixed to the quadriceps tendon nor to the patella tendon.

Here, the (quadriceps and patella) tendons that are connected to the patella are advantageously used to safely fix the patella preparation system/instrument with respect to the patella to prevent unintentional removal of the patella preparation system/instrument from the patella. As the (quadriceps and patella) tendons are thick and rigid, the clamping device and hence the patella preparation system/instrument can be fixed to the patella sturdily. Moreover, the fixation of the patella preparation system/instrument by use of the clamping device to the patella, allows a well-positioning of the patella preparation system/instrument in the sagittal plane/plane of flexion of the patella. Hence, via fixing the patella preparation system/instrument by use of the clamping device to the (quadriceps and patella) tendons, the patella preparation system/instrument can be aligned on the patella precisely, no matter if the patella is of a flat or a rounded, a wave-shaped or of any other form.

In a preferred embodiment, the clamping device/unit comprises a first and a second (arcuate) clamping arms each having/providing an upper and a lower arm element. The upper arm element can be moved relatively to the lower arm element while both elements work together in a clamping manner when the clamping device/unit is in the clamping position. In the clamping position, the first clamping arm element is encompassing the quadriceps tendon and the second clamping arm element is encompassing the patella tendon.

The such configured clamping device/unit is easy to produce and to handle while the fixing task of the clamping device/unit can be ensured.

Another advantageous embodiment of the patella preparation system/instrument relates to an embodiment of the (above) clamping device/unit, where the clamping device/unit is removably fixed to the patella preparation system/instrument, preferably the central connecting portion, specifically via an interlocking system/unit. Further preferred, the clamping device/unit is automatically/autonomously positioned with respect to the fixing device/unit and hence to the patella using at least one spring that may be provided at the central connecting portion of the fixing device.

Hence, if there is no need for specially ensuring a safe and fix position of the patella preparation system with respect to the patella, the clamping device can easily be removed from the patella preparation system. Each patient has an individually configured patella. The springs allow to individually and automatically arrange the clamping system with respect to the patella of a patient. This allows the surgeon to work quickly and accurately.

More advantageously, the guiding device is adapted to guide a cutting instrument used to perform a resection on the patella and the fixing unit/device preferably has an upper fixing portion (upper thrust plate) configured to contact the upper (anterior) surface of the patella and a lower fixing portion (lower thrust plate) configured to contact the lower (posterior) surface of the patella. The upper and the lower fixing portions, which are especially parallel to each other, are each connected to a linkage/connecting portion of the patella preparation system/instrument being adapted to extend and/or reduce the distance between the upper and lower fixing portions. The guiding unit/device is movable in a direction substantially parallel to the length axis of the connecting portion (translatory movement) and is also inclinable/tiltable relatively to the connecting portion especially to the upper fixing portion. The patella preparation system/instrument further has the (manual) actuation/operation unit/device/mechanism (afterwards simply called operation device), which comprises as a first operation unit/part a cutting height adjustment device (first individual and separate operation unit/part), which is used to position the guiding unit/device in a height with respect to the upper fixing portion and hence to the patella such that the cutting instrument can perform the resection on the patella at a preferred cutting height, especially 1 mm with respect to the upper side of the patella. Furthermore, the (manual) actuation/operation unit/device/mechanism comprises as a second operation unit/part a cutting angle adjustment device (second individual and separate operation unit/part) for adjusting the (tilting) angle of the guiding device with respect to the upper fixing portion and hence to the patella (separate to the height adjustment) such that the cutting instrument can perform the resection on the patella in a preferred angle or a preferred slope, especially an angle of the patella cut/resection in a range between 0° and +/−7° with 1° increments.

In other words, the patella preparation system/instrument according to the disclosure has the ring-shaped guiding disk provided with a circumferentially arranged slot of such height that at least a working end/effector of a cutting device can be slidingly accommodated within this slot for guiding the working end in relation to a patella. The patella preparation system/instrument further has the fixing unit/device (mechanism) with the upper and a lower fixing portions/arms/thrust plates each being connected to the central connecting portion, preferably each of the fixing portions/arms/thrust plates being connected with the connecting portion in a perpendicular manner, while the upper fixing portion/arm/thrust plate can be moved via a slidable two-part configuration of the central connecting portion relatively to the lower fixing portion/arm/thrust plate such that the upper and the lower fixing portions/arms/thrust plates can encompass the patella in a fixing/clamping manner. Moreover, the patella preparation system/instrument includes an axle-guided rotary mechanism comprising a rotary element (knop) and a cutting height adjustment axle (U-shaped socket/dome) at which the guiding disk is fixedly connected, while the rotary element is rotatable around the length axis of the cutting height adjustment axle and is, therefore, connected in a freely rotatable manner with the guiding disk (rotary element is rotatably interconnected with a guiding axle/spindle being fixedly connected to the upper fixing portion wherein the height adjustment axle is axially supported by the guiding axle/spindle via the rotary element). Accordingly. when the rotary element is rotated around the cutting height adjustment axle (socket), the cutting height adjustment axle (socket) is moved upwards and/or downwards along the non-rotating spindle wherein the height of the guiding disk in relation to the upper fixing portion and hence to the patella is adjusted/changed. Furthermore, the patella preparation system/instrument includes a gear-wheel mechanism (transmission) at least comprising a gear wheel and a toothed part configured to mesh with the gear wheel, while the guiding disk is fixed (uniformly connected) to the toothed part to be rotatable/tiltable together with the toothed part around a tilting axis being arranged in/at the central connection portion, such that the angle of the guiding disk with respect to the central connection portion and hence to the patella can be changed, when the gear wheel is rotated preferably by another rotary element (knop).

Moreover, the guiding device/unit may be embodied in form of a disk with a concentrically arranged cylindrical hole, while the diameter of the hole is at least as large as the maximum diameter of the patella. The disk is furthermore provided with a slot, which extends at least partially/sectionwise along the periphery of the disk and extends in a radial direction of the disk from its shell surface to its inner cylindrical surface. The slot is at least as high as being able to accommodate the working end of the cutting instrument. The disk is fixedly, especially integrally and/or perpendicularly, connected to a guiding axle, especially to the spindle being shiftably supported by the cutting height adjustment axle (U-shaped socket/dome) and being in screw-engagement with rotary element supported by the socket.

The guiding device/unit configured in such a way can easily accommodate and guide the working end of the cutting device, especially a saw blade of a surgical saw, within the slot of the disk. However, different ways of guiding the cutting device are imaginable.

The patella preparation system/instrument is further advantageously embodied with the cutting height adjustment device/unit being provided with the rotary element, especially a knob, which has a first, especially an internal, thread, while the rotary element is connected to the guiding device in a freely rotatable manner. Hence, the rotary element (knop) is rotatable with respect to the guiding axle/spindle, while the guiding axle/spindle does not rotate with the rotary element. Because the spindle hat a second, especially an external, thread, which is configured to cooperate with the first thread in a way that when the rotary element is rotated, especially around the length axis of the cutting height adjustment axle, the guiding axle/spindle and with it the disk is moved along the cutting height adjustment axle.

A such designed cutting height adjustment device is easy and quick to use, as only the rotary element has to be rotated. Furthermore, the adjustment of the cutting height is very precisely. Moreover, as the rotary element is separately provided from the guiding axle a rotation of the guiding device together with the rotation of the knob can be prevented.

Another preferred embodiment of the disclosure is configured in such way that the guiding axle is internally provided with a first guiding portion. The cutting height adjustment axle is provided externally with a second guiding portion. The second guiding portion of the cutting height adjustment axle is configured to be complementary to the first guiding portion of the guiding axle. Both guiding devices can be engaged with each other and may be embodied such that they prevent a rotating movement of the guiding axle/spindle with respect to the cutting height adjustment axle (socket) and only allow a movement of the guiding device and the cutting height adjustment device in a length direction of the cutting height adjustment axle and/or the guiding axle.

By the collaboration/engagement of the first and second guiding portion, a rotation of the guiding device together with the rotary element ca effectively be prevented. Moreover, the interaction of the first and second guiding portion enables a smooth and jerking-less adjustment of the cutting height via rotation of the rotary element.

The first guiding portion may be a female guiding device and may be configured as a groove which may have a flat first sliding surface. The second guiding portion may be a male guiding device, which fits into the first guiding portion. Furthermore, the second guiding portion may be configured as a rod with a flat second sliding surface with which the second guiding portion fits into the first guiding portion. Then, the second sliding face is in contact with the first sliding face.

Furthermore, the cutting height adjustment axle of the cutting height adjustment device may be provided with a scale which indicates a user of the patella preparation system the height of the disk of the guiding device with respect to the patella and hence the cutting height. The scale may show a range of angles between 0° and +/−7° with 1° increments.

When the axle is provided with a scale it is really easy for a user to adjust the preferred cutting height on the patella preparation system.

Moreover, in another preferred embodiment of the disclosure the cutting angle adjustment device includes a rotating component/element, especially in form of a knob, integrally provided with a shaft, which is configured to be inserted through the central connecting portion, especially in a direction perpendicular to the length axis of the central connecting portion. Furthermore, the cutting angle adjustment device includes a gear wheel, especially a spur gear, which is fixedly, especially integrally, connected with the shaft of the rotating component. Moreover, the cutting angle adjustment device includes a toothed part configured to mesh with the gear wheel/spur gear, while the toothed part is fixedly connected to the guiding device or the cutting angle adjustment device and is tiltably/rotatably supported by the central connecting portion by way of a rotation/tilting axle. The toothed part and the guiding device are rotatable with each other around the rotation axle. Hence, the guiding device is inclinable with respect to the upper fixing portion/part of the central connection portion.

This setup of the cutting angle adjustment device allows an easy adjustment of the angle of the guiding device with respect to the upper fixing portion and with respect to the patella. When the rotating component is rotated around the length axis of its shaft, the gear wheel fixed to the shaft of the rotating component is rotated as well. As this gear wheel meshes with the toothed part, the toothed part is rotated around the rotation/tilting axle. As the toothed part is fixedly connected to the cutting height adjustment axle, the cutting height adjustment axle is rotated together with the toothed part around the rotation/tilting axle. As the guiding device is only movable with respect to the cutting height adjustment axle in a direction of its length axis, the guiding device is rotated with the axle around the rotation/tilting axle as well. Hence, the inclination of the guiding device with respect to the upper fixing portion of the patella preparation system and with it the inclination with respect to the patella can be changed via the cutting angle adjustment device, while the patella preparation system remains fixed to the patella.

Furthermore, an advantageous embodiment of the disclosure is that the cutting angle adjustment device further includes a locking element, especially in form of a knob or bolt, which is configured to stop any rotation of the rotating component to stop tilting movement of the guiding device, when the locking element is reversibly brought in contact with the rotating component. For example, the locking element is pressed down towards the rotating component by the user, With this locking element a preferred tilting angle of the patella preparation system and especially of the guiding device with respect to the patella can be locked. Hence, an accidental rotation of the rotating component of the cutting angle adjustment device and hence an unintentional change of the cutting angle can be prevented. This fixation can easily be reversed, when the contact between the locking element and the rotating component is cancelled.

Advantageously, the locking element may have a locking part in form of a protruding portion, especially in form of a pin, and the shaft of the rotating component may be provided with a circumferentially arranged groove, which is configured to receive the locking part of the locking element, when the locking element is in contact with the rotating component.

This locking mechanism comprising the locking element and groove inside the shaft of the rotating element is easy to achieve and to manufacture.

Moreover, the upper thrust plate may have a drill guiding element/part which is usable to guide a drill relatively to the fixing device and hence to the patella.

This setup also allows to perform drilling on the patella.

Another preferred embodiment of the disclosure is that the upper fixing portion of the fixing device has a its distal end a receiving portion configured to receive the drill guiding element/part therein.

This arrangement is a space-saving design and the receiving portion of the fixing device supports the drill guiding element, for example against an unintentional inclination.

Moreover, the patella preparation system according to the disclosure may be embodied such that the lower side of the upper fixing portion, which is facing the upper side of the patella, and that the upper side of the lower fixing portion, which is facing the lower side of the patella, each have a plurality of prongs.

In this way, the fixing device can easily be fixed to the patella.

The disclosure further relates to a method for using the patella preparation system/device characterized by the following steps:
  a) Positioning of the patella preparation system/device with respect to a patella, (then)
  b) Fixation of the patella preparation system/device with the fixing/holding unit/device, especially with the help of a clamping device, (then)
  c) Adjusting the height of the cutting template or guiding unit/device with respect to the fixing/holding unit/device and hence with respect to the patella using the cutting height adjustment device, and (then)
  d) Adjusting the angle of the guiding device with respect to the fixing/holding unit/device and hence with respect to the patella using the cutting angle adjustment device.

This procedure is easy and quick to handle. The advantage for a user of the patella preparation system is that he has not to remove the patella preparation system to change the angle of the system with respect to the patella.

In other words, the disclosure relates to a patella preparation system which allows to manage all steps, like adjustment of the cutting height and adjustment of the cutting slope with respect to the patella, in one step. With the patella preparation system according to the disclosure, the height of the patella cut (each 1 mm) and also the slope or angle of the patella cut from 0° to +/−7° with a 1° increment are adjustable.

The positioning of the system on the patella can be managed by a (clamping) handle or by using the patella tendons (quadriceps and patella tendon) which further facilitates the stability of the system.

With the patella preparation system according to the disclosure, a driven patella cut angel adjustment is possible and the angle of cut can be adjusted and locked while the reference to position the tool on the patella is clear. Moreover, the surgeon using the inventive patella preparation system has an indication or a scale showing the cutting height and the cutting angle without the system having to be removed from the patella to adjust the cutting angle.

A clamping device may be used to clamp the quadriceps and/or the patella tendon to use them as a reference for cutting. There is also the possibility to remove the clamping device from the quadriceps tendon and/or the patella tendon.

Moreover, the patella preparation system is adapted to position the clamping device with respect to the quadriceps tendon and/or the patella tendon due to springs inside of a cannon which is a part of the connecting portion.

Once the patella preparation system is placed on (and fixed to) the patella, the user adjusts the cutting height with the rotary element of the cutting height adjustment device. Then, the guiding device is guided on the vertically fixed threaded axle, while the rotary element is rotated/tapped.

Via a scale provided on the axle, the height of the cut is easily visible in front of the instrument.

When the cutting height is fixed, the user adjusts the cutting slope/cutting angle with the rotating component and (un)locks it with the locking element.

Within the cutting angle adjustment device, the gear wheel is inside of the fixed parts (the upper fixing portion and the connecting portion of the fixing device) and the rotating component is fixed to the gear wheel.

The toothed part, which is fixedly connected to the working arm, is arranged in front of the gear wheel. The toothed part is fixed to the fixed parts by the rotation axle such that when the user turns the rotating component, the toothed part and with it the working arm and the cutting height adjustment axle are rotated around the rotation axle.

Once the user has defined the correct angle, the locking element comes into the groove of the (shaft of the) rotating component and stops any rotation.

As the guiding device is guided by the vertical axis of the fixed parts, the guiding device is rotated around the rotation axle as well. Like that, the user can fix the slope/angle at least from −7° to +7° with a 1° increment.

BRIEF DESCRIPTION OF THE DRAWINGS

The disclosure is explained in more detail below on the basis of a preferred embodiment using figures. The figures are of a schematic nature and intended to improve the understanding of the disclosure. Same elements are referenced to with the same reference signs.

DETAILED DESCRIPTION

In this application, when it can be read that a first element "is fixedly connected to" a second element, the wording "fixedly connected to" means that when the first device is moved in an arbitrary way, the second device is moved together with the second device in the same way.

Figure 1:
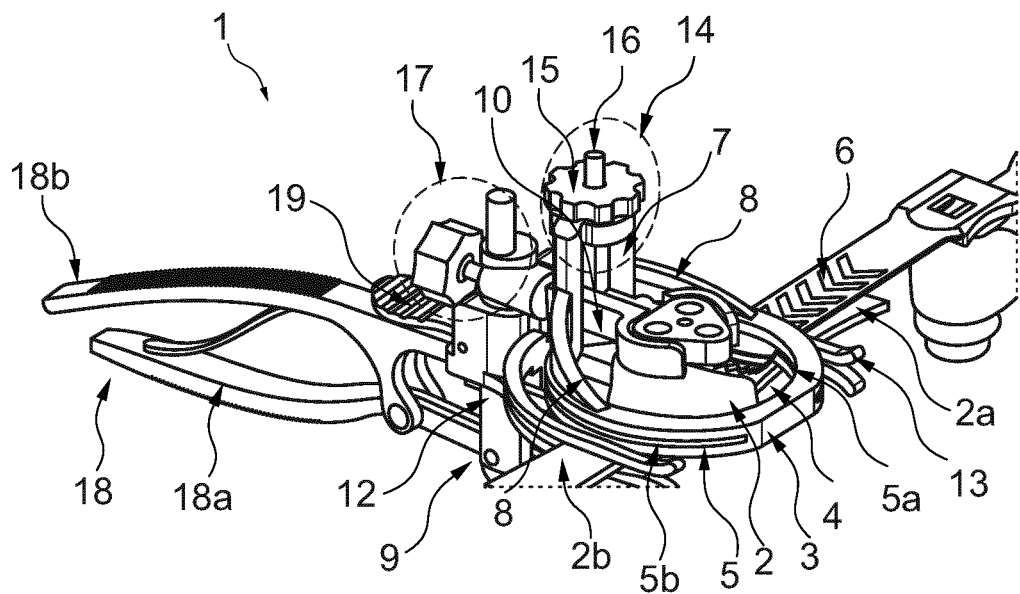
FIG. 1 shows a perspective view of a patella preparation system/instrument according to the disclosure being fixed to the patella.

FIG. 1 shows a perspective view of a patella preparation system/instrument (PPS) 1, which is illustrated in a position where it is fixed to a patella 2. The patella 2 is at a first position connected with a quadriceps (not shown) via a quadriceps tendon 2a and is at a second position, which is diametrically opposed to the first position, connected with a tibia (not shown) via a patella tendon 2b. The PPS 1 includes a guiding device/unit 3 preferably in form of a circular disk or ring 3 with a concentrically arranged through hole 4 providing a circular opening. The disk/ring 3 does not have to be a perfect circular form but can also be truncated. The disk/ring 3 does not even have to be circular but can also have a, for example, rectangular shape. The diameter of the hole 4 is at least as large as the maximum diameter of the patella 2 or lager such that the disk/ring 3 can be arranged around the patella 2, when the PPS 1 is positioned and/or fixed at/to the patella 2.

The disk/ring 3 is provided with a slot 5 which extends in radial and circumferential direction of the disk/ring 3. The slot 5 does not have to be arranged over the whole circumference of the disk/ring 3 but can be, for example, two parted. In this case, a first piece 5a of the slot 5 may at least be arranged such that it extends in a region near to the first position where the patella 2 is connected with the quadriceps tendon 2a, when the PPS 1 is positioned at the patella 2. Then, a second piece 5b of the slot 5 may be diametrically opposed to the first piece 5a of the slot 5 such that it is arranged in a region near to the second position where the patella 2 is connected with the patella tendon 2a, when the PPS 1 is positioned at the patella 2.

The slot 5 extends in a radial direction of the disk/ring 3 from the shell surface of the disk/ring 3 to its inner cylindrical surface provided by the hole 4. The height of the slot 5 is at least so high that the slot 5 can accommodate a working end of a cutting device 6, such as a saw blade of a surgical saw, etc. The cutting device 6 is separately provided from the PPS 1 and not part of the disclosure.

The disk/ring 3 is fixedly, especially integrally, connected with a socket-like cutting height adjustment axle 7. In the embodiment of the PPS 1 according to FIG. 1, the disk/ring 3 is connected with the cutting height adjustment axle 7 in a perpendicularly manner. The cutting height adjustment axle 7 is here configured as a kind of a sleeve or a dome which may have an inclined outer surface and/or may be provided with openings on its outer circumferential surface. In other words, the cutting height adjustment axle 7 is preferably formed as a U-shaped socket comprising two parallel distanced legs 7a, 7b which are interconnected with each other at their one (upper) ends by a bar/yoke 7c and which are connected to the disk/ring 3 at their other (lower) ends in a perpendicular manner. The connection of the cutting height adjustment axle 7 with the disk/ring 3 may be strengthened by reinforcing ribs or stiffeners 8. Here, two reinforcing ribs/stiffeners 8 are arranged between the disk 3 and the cutting height adjustment axle 7.

Moreover, the PPS 1 includes a fixing device/unit 9. The fixing device 9 includes an upper fixing portion (upper thrust plate arrangement) 10, a lower fixing portion (lower thrust plate arrangement) 11 which is not illustrated in FIG. 1 and a central connecting portion/part 12. The upper fixing portion 10 is fixedly and especially integrally connected with the central connecting portion 12 at an upper connecting portion 12a (not particularly illustrated in FIG. 1) of the connecting portion 12 preferably by two parallel distanced connecting arms. The lower fixing portion 10 is fixedly and especially integrally connected with the central connecting portion 12 at a lower connecting portion 12b (not particularly illustrated in FIG. 1) of the connecting portion 12. The upper connecting portion 12a and the lower connecting portion 12b are movable relative to each other in a slidable, preferably telescopic manner along the length axis of the connecting portion 12. In this way, the upper fixing portion 10 can be moved/distanced with respect to the lower fixing portion 11 to fix/clamp the patella 2 in between, when the PPS 1 is positioned at the patella 2. Here, the upper connecting portion 12a is configured to be insertable into the lower connecting portion 12b.

The upper fixing portion 10 is arranged above the upper surface of the patella 2, when the PPS 1 is positioned at the patella 2, and the lower fixing portion 11 is arranged below the lower surface of the patella 2, when the PPS 1 is positioned at the patella 2. In a case, where the PPS 1 is positioned at the patella 2, in a fixing position the lower surface of the upper fixing portion 10 contacts/fixes the upper surface of the patella 2 and the upper surface of the lower fixing portion 11 contacts/fixes the lower surface of the patella 2.

Furthermore, in the embodiment shown in FIG. 1, the PPS 1 includes a clamping device 13, which will be described in detail later. Further, the PPS 1 includes an operation device, having a cutting angle adjustment device 17, which will be explained in detail later and a cutting height adjustment device 14 comprising a rotary component/element (knop) 15, a spindle 16 and the cutting height adjustment axle 7, which will be explained in detail hereinafter.

Hence, the operation device here includes the cutting height adjustment device 14 for separately and individually adjusting the height of the guiding device 3 in relation to the patella 2 and includes the cutting angle adjustment device 17 for separately and individually adjusting the inclination/tilting of the guiding device 3 in relation to the patella 2. Here, the guiding device 3 is movable in a translatory direction of (the connecting portion 12 of) the PPS 1 by the cutting height adjustment device 14 and is separately therefrom inclinable/tiltable by the cutting angle adjustment device 17 in a direction of the up-and-down direction (connecting portion 12 of) of the PPS 1, meaning a direction between the lower fixing portion 11 and the upper fixing portion 10.

The PPS 1 is further provided with a handle 18, which is formed like the handle of a forceps. The handle 18 has a movable handle arm or branch 18a and a fixed handle arm or branch 18b. The movable handle arm 18a is pivotably connected to the fixed handle arm 18b, which latter one is fixed to the lower connecting portion 12b of the connecting portion 12. Hence, the movable handle arm 18a being pivotably arranged with respect to the fixed handle arm 18b is interconnected with the upper connection portion 12b of the central connection part 12. Accordingly, if the handle 18 is manually actuated, the upper and lower connection portions 12a, 12b of the central connection part 12 are moved relative to each other such that the upper and lower thrust plates 10, 11 are distanced and/or converged.

Finally, the fixing device comprises a manually actuatable locking mechanism, having a rest lever 19 pivotably supported by the lower connection portion 12b and which is in locking contact with the upper connection portion 12a in a locking state. The fixing device 9 can, therefore, be transitioned from the fixing position to an open position, in which the lower fixing portion 11 is no longer in contact with the lower surface of the patella 2, via the rest lever 19 if the rest lever is moved from its locking state into a release state. In this case the upper fixing portion 10 can be moved relative to the lower fixing portion in a translatory manner as the upper fixing portion 10 is fixedly connected with the upper connecting portion 12a and the lower fixing portion 11 is fixedly connected to the lower connecting portion 12b. As the upper connecting portion 12a is movable in a translatory manner with respect to the lower connecting portion 12b, the upper fixing portion 10 is moved together with the upper connecting portion 12a with respect to the fixed lower fixing portion 11.

Figure 3:
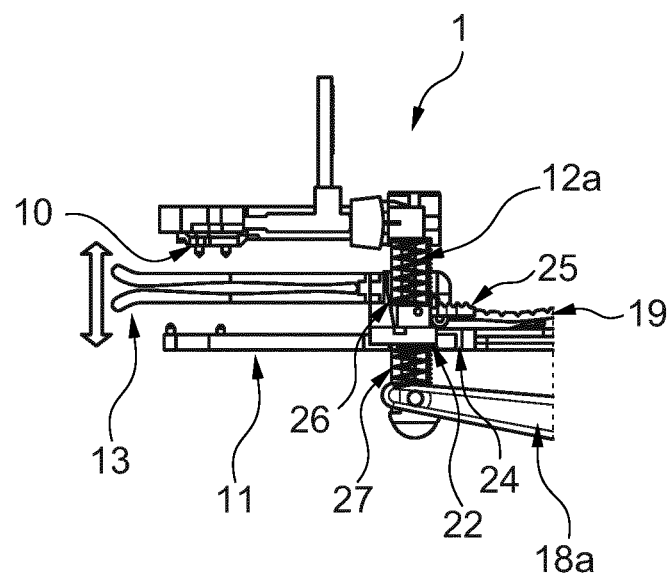
FIG. 3 shows a longitudinal sectional view of the patella preparation system with springs arranged at a connecting portion of the patella preparation system.

Therefore, the upper connecting portion 12a may be provided with a corrugated outer shell surface (bolt) which is complementary to a corrugated inner surface (hole) of the lower connecting portion 12b at the region where the connecting portion 12b accommodates the upper connecting portion 12a, see in detail FIG. 3.

Figure 2:
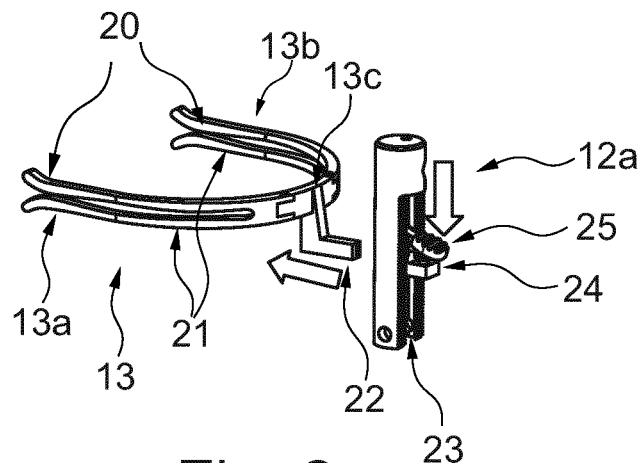
FIG. 2 illustrates a mechanism with which a clamping device can be mounted to the patella preparation system.

FIG. 2 is a perspective view of the clamping device 13 and the upper connecting portion 12a.

The clamping device 13 may be connected removably via the upper connecting portion 12a with the PPS 1 to ease positioning of the guiding device 3 and hence the cutting device 6 with respect to the fixing device 9 (and hence to the patella 2). The clamping device 13 can be transitioned between a clamping position in which the clamping device 13 encompasses the quadriceps tendon 2a and the patella tendon 2b and a released position in which the clamping device 13 is not fixed to and has no contact with the quadriceps tendon 2a and the patella tendon 2b.

The clamping device 13 is formed to be arc-like. The clamping device 12 consists here of three parts:
 a first arc-shaped clamping arm 13a,
 a second arc-shaped clamping arm 13b forming a U-like fork together with the first clamping arm 13a and
 a connection part or central coupling piece 13c.

The connection clamping part 13c is arranged between the first clamping arm 13a and the second clamping arm 13b and connects both arms with each other. For example, each arm 13a, 13b is connected with the connection part 13c via a plug-like connection.

Each clamping arm 13a, 13b has an upper arm element 20 and a lower arm element 21 which can be moved with respect to each other and which work together in a clamping manner when the clamping device is in a clamping position. In a clamping position, the first clamping arm 13a is encompassing the quadriceps tendon 2a and the second clamping arm 13b is encompassing the patella tendon 2b. Alternatively, the upper and lower arm elements are fixedly interconnected with each other in a leaf spring manner.

The connecting clamping part 13c is provided with a plug 22 which may be formed in a L-like manner. The upper connecting portion 12a is at least partly formed like a (hollow) sleeve which has a closed/continuous top surface. Inside the sleeve there is provided a groove 23 which extends in a longitudinal direction of the sleeve. Inside this groove 23 a clamping portion/part 24 and a pressing portion/part 25 are arranged next to each other. The pressing portion/part 25 is arranged above the clamping portion/part 24 (the pressing portion is arranged between to the inner top surface of the upper connecting portion 12a and the clamping portion 24). The pressing portion 25 and the clamping portion 24 work together to form a recess (not particularly shown in FIG. 2). This recess is at least as large such that it can accommodate at least the portion of the plug 22 which is protruding from the connecting clamping part 13c (protruding portion). This protruding portion is compatibly insertable or snappable into the recess.

When the protruding portion of the plug 22 is arranged inside of the recess the clamping device 13 is mounted to the PPS 1. If a user of the PPS 1 wants to remove the clamping device 13, he can press the pressing portion 25 down to the clamping portion 24. Then the recess gets so large that it releases the protruding portion of the clamping device 13. With such a configuration, the clamping device can be mounted to or removed from the PPS 1 very easily and quickly.

The clamping portion 24 and the pressing portion 25 are arranged within the inner space of the upper connecting portion 12a to be slidable in a longitudinal direction of the upper connecting portion 12a.

FIG. 3 is a longitudinal sectional view of the PPS 1. For ease of understanding, the guiding device/disk/ring 3 is not illustrated in this FIG. 3. Here, the clamping device 13 is fixed to the PPS 1. It is visible that the upper connecting portion 12a accommodates two springs 26, 27 in its inner space (cannon). The first spring 26 is arranged and fixed between the upper end of the upper connecting portion 12a and the top of the pressing portion 25. The second spring 27 is arranged and fixed between the movable arm 18a and the lower surface of the clamping portion 24.

When the movable handle part 18a is pressed towards the fixed handle part 18b (by the user), the spring 26 is stretched and hence pulls the clamping device 13 downwards (in a direction towards the bottom part of the connecting portion 12) in a length direction of the connecting portion 12. Hence, the position of the clamping device 13 can easily and automatically be changed with help of the springs 26, 27 and hence be arranged appropriately for the patella to be operated with the PPS 1.

Furthermore, in FIG. 3 it can been seen that the lower surface of the upper fixing part (upper thrust plate arrangement) 10 and the upper surface of the lower fixing part (lower thrust plate arrangement) 11 are each provided with a plurality of prongs. These prongs help to fix the patella 2 between the upper and the lower fixing parts 10, 11, when the PPS 1 is fixed to the patella 2.

Figure 4:
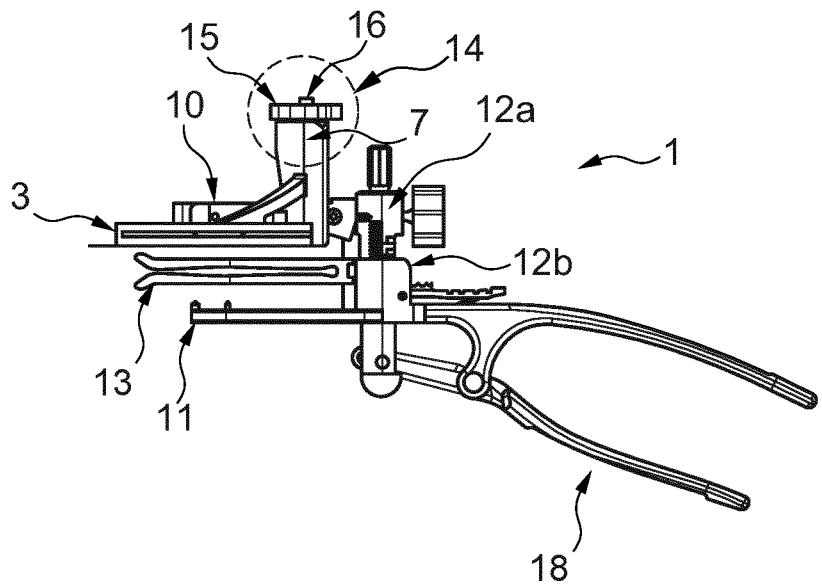
FIG. 4 is a side view of the patella preparation system.

FIG. 4 is a side view of the complete PPS 1 with the clamping device 13 fixed to the PPS 1. Here, it can be seen that the upper fixing part 12a is provided with a scale which indicates the height of the patella in mm. This height scale indicates at which height the PPS 1 is fixed to the patella 2.

Figure 5:
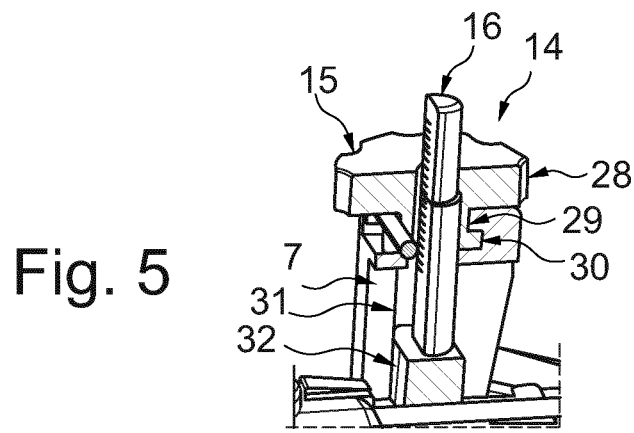
FIG. 5 shows a perspective sectional view of a cutting height adjustment device of the patella preparation system.

FIG. 5 shows a perspective sectional view of the cutting height adjustment device 14 of the PPS 1 connected to the guiding axle 7. As already mentioned before, the cutting height adjustment device 14 comprises the rotary element 15 and the (U-shaped) cutting height adjustment axle 7. Here, the rotary element 15 is configured as a knob with a disk-like upper (manually operable) plate 28, a connecting throat 29 and a disk-like lower plate 30. The connecting throat 29 and the lower plate 30 configure a flange with which the rotary element 15 is connected with an inner space of the cutting height adjustment axle 7 at its upper part. Accordingly, the rotary element 15 is connected with the cutting height adjustment axle 7 in such way that it is freely rotatable with respect to the cutting height adjustment axle 7 but cannot be shifted in axial direction relative to the cutting height adjustment axle 7. The cutting height adjustment axle 7 is hence provided with a recess that can accommodate the flange of the rotary element 15.

The guiding axle 16 is formed like a partly threaded rod or spindle and is, on its outer surface, provided with a scale showing the user of the PPS 1 the actual cutting height in mm. The inner surface of the at least partially hollow cutting height adjustment axle 7 is provided with a first guiding portion 31. This first guiding portion 31 is configured to be complementary to a second guiding portion 32, which is externally provided on the guiding axle/spindle 16 at a lower part of the guiding axle 16. Both guiding portions are embodied such that they prevent a rotating movement of the cutting height adjustment axle 7 with respect to the guiding axle 16. The cutting height adjustment axle 7 is connected/linked/coupled to the guiding axle 16 in such way that the cutting height adjustment axle 7 can be moved relative to the (vertically fixed) guiding axle 16 along its longitudinal direction.

Here, the first guiding portion 31 is configured as a rail with a flat sliding surface on which a flat sliding surface of the first guiding portion 32, which is formed in a box-like manner, can slide, when the rotary element 15 is rotated.

Furthermore, the rotary element 15 is provided with a concentrically arranged through hole extending in its longitudinal direction which is provided with a first thread. The guiding axle/spindle 16 is provided with a second thread on its outer surface. The first thread and the second thread are meshing with each other.

Accordingly, when the rotary element 15 is rotated around the length axis of the guiding axle/spindle 16, the first thread meshes with the second thread such that the rotary element 15 and with it the cutting height adjustment axle/socket 7 is moved downwards or upwards along the longitudinal direction of the guiding axle/spindle 16. As the rotary element 15 is freely rotatable with respect to the cutting height adjustment axle 7 and the cutting height adjustment axle 7 is connected/linked to the guiding axle 16 in a slidable manner, the cutting height adjustment axle 7 is moved upwards or downwards together with the rotary element 15 without being rotated. As the cutting height adjustment axle 7 is fixedly connected to the disk/ring 3 of the guiding device 3, the disk/ring 3 is moved together with the cutting height adjustment axle 7. In this way, the height of the disk/guiding device 3 of the PPS 1 with respect to the patella 2 and hence the cutting height of the PPS 1 can be adjusted with the such configured cutting height adjustment device 14.

Figure 6:
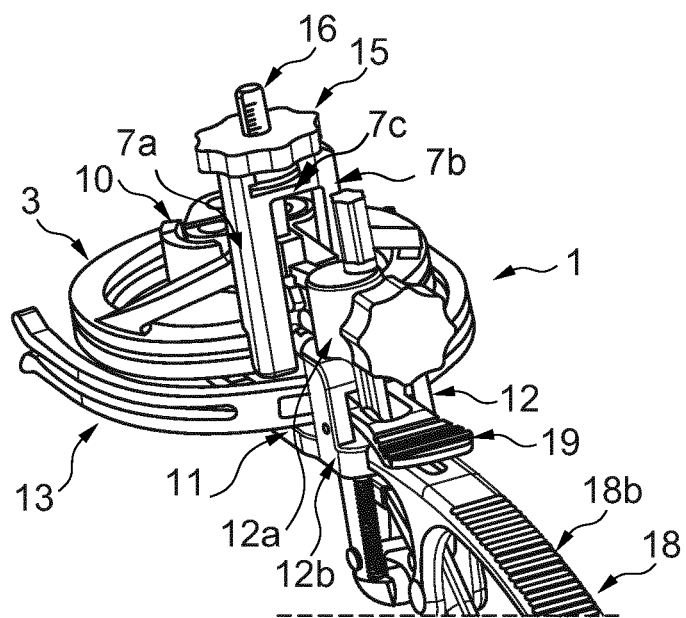
FIG. 6 illustrates a perspective view of the patella preparation system from a user's view.

FIG. 6 illustrates a perspective view of the PPS 1 from a perspective of the user of the PPS 1. It is visible that the scale of the guiding axle 16 is directed to the user.

Figure 7:
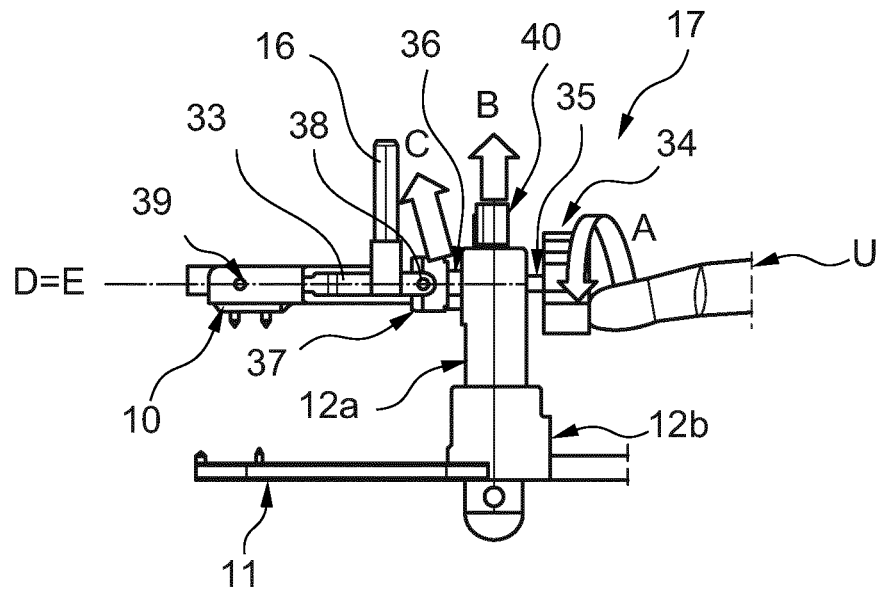
FIG. 7 shows a side view of the patella preparation system and especially a cutting angle adjustment device, where a toothed part of the cutting angle adjustment device is not inclined/tilted.

FIG. 7 shows a side view of some elements of the PPS 1 and especially shows the section of the PPS forming the cutting angle adjustment device 17. In this figure, for the ease of understanding, only the upper fixing portion 10, the lower fixing portion 11, the connecting portion 12, the guiding axle 16 and the cutting angle adjustment device 17 are illustrated.

In FIG. 7 a working/lever arm 33 is illustrated which (at its middle portion) is fixedly connected with the guiding axle 16, here in a perpendicularly manner. The working/lever arm 33 is pivotally linked with the upper fixing portion 10 at their free (distal) end portions, respectively, wherein the working/lever arm 33 and extends towards the central connection part 12 between the two parallel distanced connection arms of the upper fixing portion. Accordingly, the working/lever arm 33 and, therefore, the guiding axle/spindle 16 (being fixedly connected with the working/lever arm 33) can pivot upward and downward around the linkage at the free/distal end portion of the upper fixing portion 10.

The cutting angle adjustment device 17 comprises a rotating component (knop) 34 integrally provided with a rotating shaft 35, which is insertable/inserted into an opening within the upper fixing portion 12a of the central connection part 12, the opening extending through the upper fixing portion 12a along its transverse direction. The distal/free end of the shaft 35 is fixedly connected to a gear wheel (spur-gear) 36. The gear wheel 36 is configured to mesh with a divided circle-like toothed part 37 which is fixedly connected to the working/lever arm 33 preferably via a connection pin 38. S already stated above, the working/lever arm 33 is pivotably supported at the upper fixing portion 10 by a bearing/pivoting axle 39. In this case, the length axis of the working/lever arm 33 and the length axis of the upper fixing portion 10 are parallel, especially identical, to each other.

In FIG. 7, a finger of a user U is shown. The arrow A shows the direction the user U can turn the rotating component/element 34 into. The arrow B indicates that a locking element 40 is in an "Up-position", in which the locking element 40 is not in contact with the shaft 35 of the rotating component/element 34. The arrow C indicates the direction in which the toothed part 37 is going to move when the rotating component/element 34 is rotated in the direction of arrow A. This means that in case the rotating element/knop 34 is manually turned/rotated, the working/lever art 33 is pivoted around the pivoting axle 39 thereby tilting the guiding axle/spindle 16 and the cutting height adjustment axle 7 at which the guiding disk/ring 3 is fixed.

Figure 8:
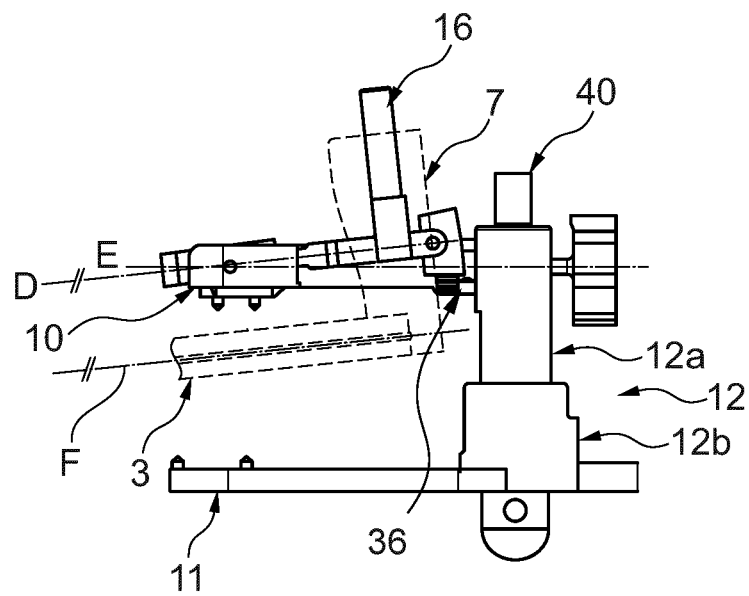
FIG. 8 shows a side view of the patella preparation system and especially the cutting angle adjustment device, where the toothed part of the cutting angle adjustment device is inclined/tilted.

FIG. 8 shows the assembly of FIG. 7 when the rotating component/element 34 has been rotated in the direction of the arrow A of FIG. 7 around the length axis of the shaft 35 coming from the position shown in FIG. 7. In this case, the gear wheel 36 is rotated together with the shaft 35 of the rotating component 34 while the locking element 40 is still not in contact with the shaft 35 (release position). As the gear wheel 36 meshes with the toothed part 37, the toothed part 37 into the direction indicated by arrow C in FIG. 7. As the toothed part 37 is fixedly connected to the working/lever arm 33, the working/lever arm 33 is rotated around the rotation axle 38 together with the toothed part 37. The working/lever arm 33 is rotatably supported by the bearing axle 39 with respect to the upper fixing part 10. The working/lever arm 33 is perpendicularly and fixedly connected with the guiding axle 16. Due to the rotation of the working/lever arm 33 around the rotation axle 38, the guiding axle/spindle 16 is inclined with respect to the upper fixing portion 10.

As the cutting height adjustment axle 7 (illustrated as a hatched line in FIG. 8) is fixedly connected with the guiding axle 16 and the guiding device 3 (illustrated as a hatched line in FIG. 8) is fixedly and especially perpendicularly connected with the cutting height adjustment axle 7, the guiding device 3 is also is inclined with respect to the upper fixing portion 10.

Hence, when rotating the rotating component/element 34 around the length axis of its shaft 35, the length axis D of the working arm 33 is inclined with respect to the length axis E of the upper fixing portion 10. Then, as well the length axis F of the guiding device 3 is inclined with respect to the length axis E of the upper fixing portion 10. Thus, when rotating the rotating component 34 around the length axis of its shaft 35, the angle of the guiding device 3 with respect to the upper fixing portion 11 has been changed and hence the angle of the guiding device 3 with respect to the patella 2 has been changed, when the PPS 1 is positioned and/or fixed to the patella 2. The PPS 1 with the such configured cutting angle adjustment device 17 allows an amendment of the cutting angle/cutting slope without removing the PPS 1 from the patella 2.

After a preferred cutting angle has been adjusted with the cutting angle adjustment device 17 (hence, after the rotating component 34 has been rotated), the locking element 40 can be brought in contact with the shaft 35 to stop any further (unintended) rotation of the rotating component 34.

Figure 9:
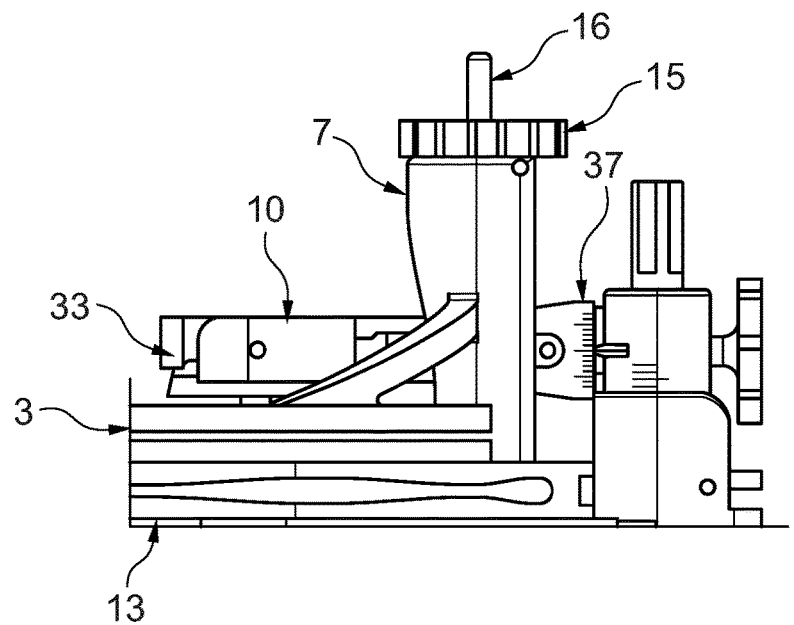
FIG. 9 illustrates a sectional side view of the cutting angle adjustment device in detail.

FIG. 9 illustrates a sectional side view of the cutting angle adjustment device in detail. Here, it can be seen, that the toothed part 37 is provided with a scale which indicated the current cutting angle/slope/inclination in °.

Figure 10:
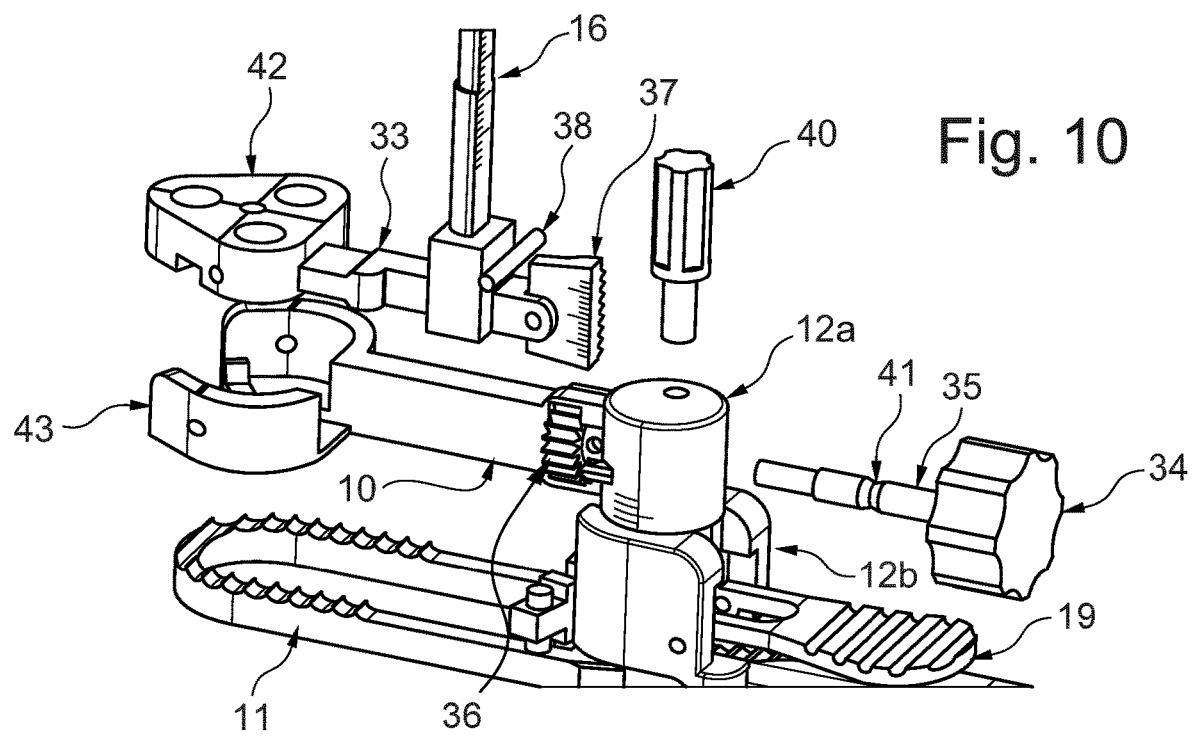
FIG. 10 is an exploded view of the patella preparation system according to the disclosure and especially of the main components of the cutting angle adjustment device.

FIG. 10 is an exploded view of the PPS and especially of the main components of the cutting angle adjustment device 17. In this view, it is visible that the locking element 40 is configured as a pin, which is configured to be insertable into a groove 41 of the shaft 35. The groove 41 is circumferentially arranged around the shaft 35. The top surface of the upper fixing part 12a is provided with a hole which can accommodate the pin-like locking element 40. The hole has to be configured such that the locking element 40 can be inserted into the groove 41 of the rotating component 34.

Furthermore, it can be seen that the rotation axle 38 is also configured as a pin. The working arm 33 is provided with a working end 42 at its distal end. This working end 42 can be used as a guide for a drill (not shown). In this case, the working end 42 is provided with through holes that can guide the drill(s) towards the patella 2. To ensure stable holding of the working end 42, the upper fixing part 10 is provided with a receiving portion 43 at its distal end configured to receive the working end 42.

The invention claimed is:

1. A patella preparation system comprising:
 a fixing device adapted to hold a patella, wherein the fixing device comprises a central connecting portion, an upper fixing portion configured to contact an anterior surface of the patella, and a lower fixing portion configured to contact a posterior surface of the patella, the upper fixing portion and the lower fixing portion being parallel distanced to each other and being connected to the central connecting portion;
 a guiding device which is linked to the fixing device to be movable relative to the fixing device by translatory and tilting movements/motions, wherein the guiding device is adapted to guide a cutting instrument used to perform a resection on the patella, and the guiding device is movable in a direction parallel to a length axis of the central connecting portion and is inclinable relatively to the upper fixing portion and the lower fixing portion;
 an operation device for manually moving the guiding device relative to the fixing device individually and separately in a translatory and a tilting manner; and
 a clamping device which is used to ease positioning and/or fixation of the guiding device at the patella, the clamping device being configured to be transitioned between a clamping position, in which the clamping device is configured to encompass each of a quadriceps tendon and a patella tendon, and a released position, in which the clamping device is neither fixed to the quadriceps tendon nor to the patella tendon; wherein the fixing device, the guiding device, the operation device, and the clamping device are each provided as individual and separate parts of the patella preparation system.

2. The patella preparation system according to claim 1, wherein the clamping device includes a first clamping arm and a second clamping arm each having an upper arm element and a lower arm element which can be moved with respect to each other and which work together in a clamping manner, when the clamping device is in the clamping position, while in the clamping position the first clamping arm is configured to encompass the quadriceps tendon and the second clamping arm is configured to encompass the patella tendon.

3. The patella preparation system according to claim 1, wherein the clamping device is removably mountable to the patella preparation system via a clamping or an interlocking mechanism, the clamping device being automatically positioned with respect to the fixing device and hence to the patella via springs that are provided at a connecting portion of the fixing device.

4. A patella preparation system comprising:
 a fixing device being adapted to hold a patella, wherein the fixing device comprises a central connecting portion, an upper fixing portion configured to contact an anterior surface of the patella and a lower fixing portion configured to contact a posterior surface of the patella, the upper fixing portion and the lower fixing portion being parallel distanced to each other and being connected to the central connecting portion,
 a guiding device which is linked to the fixing device to be moveable relative to the fixing device by translatory and tilting movements/motions, wherein the guiding device is adapted to guide a cutting instrument used to perform a resection on the patella, and the guiding device is movable in a direction parallel to a length axis of the central connecting portion and is inclinable relatively to the upper fixing portion and the lower fixing portion, and
 an operation device for manually moving the guiding device relative to the fixing device individually and separately in a translatory and a tilting manner, wherein the fixing device, the guiding device, and the operation device are each provided as individual and separate parts of the patella preparation system, and
 the operation device comprises:
  a cutting height adjustment device which is configured to position the guiding device in a height with respect to the patella such that the cutting instrument can perform the resection on the patella with a preferred cutting height, and
  a cutting angle adjustment device for adjusting an angle of the guiding device with respect to at least the upper fixing portion of the fixing device and hence to the patella separately to the cutting height adjustment device such that the cutting instrument can perform the resection on the patella in a preferred angle.

5. The patella preparation system according to claim 4, wherein the guiding device is embodied in form of a disk with a concentric and hollow cylindrical hole defining an inner cylindrical surface a diameter of the concentric and hollow cylindrical hole being at least as large as a maximum diameter of the patella, while the disk is provided with a slot which extends at least partially along a periphery of the disk and extends in a radial direction of the disk from a shell surface of the disk to the inner cylindrical surface of the disk, while the slot is at least as high as being able to accommodate a working end of the cutting instrument, and the disk is fixedly connected with a cutting height adjustment axle.

6. The patella preparation system according to claim 5, wherein the disk is integrally and/or or perpendicularly connected with the cutting height adjustment axle.

7. The patella preparation system according to claim 5, wherein the cutting height adjustment device is provided with a rotary element having a first thread and being coupled to the cutting height adjustment axle in a freely rotatable manner, while the cutting height adjustment device is further provided with a guiding axle having a second thread which is configured to cooperate with the first thread of the rotary element such that when the rotary element is rotated the cutting height adjustment axle and with it the disk is moved along a length direction of the guiding axle.

8. The patella preparation system according to claim 7, wherein the cutting height adjustment axle is internally provided with a first guiding portion which is configured to be complementary to a second guiding portion externally provided on the guiding axle while both guiding portions are embodied such that they prevent a rotating movement of the cutting height adjustment axle with respect to the guiding axle.

9. The patella preparation system according to claim 7, wherein the guiding axle is provided with a scale which indicates to a user of the patella preparation system the height of the guiding device with respect to the patella and hence indicates a cutting height.

10. The patella preparation system according to claim 7, wherein the first thread is an internal thread and the second thread is an external thread.

11. The patella preparation system according to claim 7, wherein when the rotary element is rotated around the length axis of the guiding axle, the cutting height adjustment axle and with it the disk is moved along the length direction of the guiding axle.

12. The patella preparation system according to claim 7, wherein the cutting angle adjustment device includes a rotating component integrally provided with a shaft which is configured to be inserted through the central connecting portion a gear wheel which is fixedly connected to the rotating component and further includes a toothed part configured to mesh with the gear wheel, while the toothed part is fixedly connected to a lever arm, which itself is fixedly connected with the guiding device and is rotatably supported via a bearing axle at a free end portion of the upper fixing portion, such that the guiding device is inclinable with respect to the upper fixing portion.

13. The patella preparation system according to claim 12, wherein the shaft is configured to be inserted through the central connecting portion in a direction perpendicular to the length axis of the central connecting portion.

14. The patella preparation system according to claim 12, wherein the lever arm is fixedly connected with the guiding axle.

15. The patella preparation system according to claim 12, wherein the cutting angle adjustment device further includes a locking element which is configured to stop any rotation of the rotating component, when the locking element is reversibly brought in contact with the rotating component.

16. The patella preparation system according to claim 15, wherein the locking element has a locking part comprising a protruding portion and the shaft of the rotating component is provided with a circumferentially arranged groove, which is configured to receive the locking part of the locking element, when the locking element is brought in contact with the rotating component.

17. The patella preparation system according to claim 12, wherein the lever arm has at its distal free end a drill guiding element which is usable to guide a drill relatively to the upper fixing portion and hence to the patella, which drill guiding element is pivotally connected with the upper fixing portion via the bearing axle.

18. The patella preparation system according to claim 17, wherein the upper fixing portion has at its distal free end a receiving portion configured to receive the drill guiding element.

19. The patella preparation system according to claim 4, wherein the upper fixing portion and the lower fixing portion are arranged parallel to each other.

20. A patella preparation system comprising:
a fixing device being adapted to hold a patella, wherein the fixing device comprises a central connecting portion, an upper fixing portion configured to contact an anterior surface of the patella and a lower fixing portion configured to contact a posterior surface of the patella, the upper fixing portion and the lower fixing portion being parallel distanced to each other and being connected to the central connecting portion,
a guiding device which is linked to the fixing device to be moveable relative thereto by translatory and tilting movements/motions, wherein the guiding device is adapted to guide a cutting instrument used to perform a resection on the patella and the guiding device is movable in a direction parallel to a length axis of the central connecting portion and is inclinable relatively to the upper fixing portion and the lower fixing portion, and
an operation device for manually moving the guiding device relative to the fixing device individually and separately in a translatory and a tilting manner, wherein the operation device comprises:
a cutting height adjustment device which is configured to position the guiding device in a height with respect to the patella such that the cutting instrument can perform the resection on the patella with a preferred cutting height, and
a cutting angle adjustment device for adjusting an angle of the guiding device with respect to at least the upper fixing portion of the fixing device and hence to the patella separately to the cutting height adjustment device such that the cutting instrument can perform the resection on the patella in a preferred angle, wherein
the guiding device is embodied in form of a disk with a concentric and hollow cylindrical hole defining an inner cylindrical surface, a diameter of the concentric and hollow cylindrical hole being at least as large as a maximum diameter of the patella, while the disk is provided with a slot which extends at least partially along a periphery of the disk and extends in a radial direction of the disk from a shell surface of the disk to the inner cylindrical surface of the disk, while the slot is at least as high as being able to accommodate a working end of the cutting instrument, and the disk is fixedly connected with a cutting height adjustment axle.

* * * * *